(12) United States Patent
Grieve (10) Patent No.: US 7,815,701 B2
(45) Date of Patent: Oct. 19, 2010

(54) PORTABLE APPARATUS FOR CLEANING AIR FILTERS

(76) Inventor: Dennis R. Grieve, P.O. Box #3, Crawford, CO (US) 81415

( * ) Notice: Subject to any disclaimer, the term of this patent is extended or adjusted under 35 U.S.C. 154(b) by 352 days.

(21) Appl. No.: 11/978,304

(22) Filed: Oct. 29, 2007

(65) Prior Publication Data

US 2009/0000259 A1    Jan. 1, 2009

Related U.S. Application Data

(60) Provisional application No. 60/946,711, filed on Jun. 27, 2007.

(51) Int. Cl.
*B01D 46/04*    (2006.01)
(52) U.S. Cl. .......................... 55/294; 55/302
(58) Field of Classification Search ............... 55/294, 55/302, 295, 296, 297, 298, 293, 300, 303; 95/278, 279, 280; 15/304, 321, 352; 210/391, 210/393, 394
See application file for complete search history.

(56) References Cited

U.S. PATENT DOCUMENTS

| | | | | |
|---|---|---|---|---|
| 4,377,401 A * | 3/1983 | Laughlin | ..................... | 55/290 |
| 4,802,983 A * | 2/1989 | Howeth | ....................... | 55/302 |
| 4,810,270 A * | 3/1989 | Terry et al. | .................. | 55/294 |
| 4,826,512 A * | 5/1989 | Fuller | ........................... | 55/283 |
| 5,565,012 A * | 10/1996 | Buodd | ......................... | 55/294 |
| 5,584,900 A * | 12/1996 | Zaiser et al. | ................. | 55/293 |
| 6,280,491 B1 * | 8/2001 | Oke | ............................ | 55/300 |
| 6,283,305 B1 * | 9/2001 | Maeda et al. | ............... | 210/356 |
| 6,368,390 B1 * | 4/2002 | Bitner et al. | ................. | 95/277 |

* cited by examiner

*Primary Examiner*—Duane Smith
*Assistant Examiner*—Minh-Chau Pham
(74) *Attorney, Agent, or Firm*—James Ray & Associates (57) ABSTRACT

A portable apparatus for cleaning an elongated air filter includes housing, a generally closed chamber which is formed within the housing and which has an irregular inner wall surface capable of providing resistance to a fluid flow discharged into the chamber and a hollow shaft mounted for rotation within the housing and extending through the chamber. One end of the shaft is connected to a source of fluid under pressure. A plurality of nozzles are secured to the elongated shaft and positioned within the chamber and a plurality of orifices are radially formed through a wall of the hollow shaft. Fluid which is supplied under pressure to the shaft exits through the plurality of jets forming the fluid flow that causes rotation of the shaft and exits the plurality of orifices toward an inner surface of a filtering medium of such air filter causing contaminants to exit such air filtering medium.

18 Claims, 5 Drawing Sheets

PORTABLE APPARATUS FOR CLEANING AIR FILTERS

CROSS-REFERENCE TO RELATED APPLICATIONS

This application is related to and claims priority from Provisional Patent Application Ser. No. 60/946,711 filed Jun. 27, 2007.

FIELD OF THE INVENTION

The present invention relates, in general, to air filter cleaning devices and, more particularly, this invention relates to a portable apparatus for cleaning, by way of compressed air, air filters which are used in internal combustion engines on heavy off-road and over the road vehicles.

BACKGROUND OF THE INVENTION

As is generally well known, air filters are used extensively to prevent particulate impurities such as dust and dirt from entering into the combustion chambers of engines. A typical air filter is annular in construction and has a filtering medium which is incorporated into the cylindrical side wall and which allows for passage of air but traps the particulates on its outer surface. When the particulate build-up becomes significant, the air flow through the filtering medium is restricted causing abnormal operation of the combustion engine that increases operating costs and may potentially result in engine failure.

On passenger-type vehicles, it takes a relatively long period of time for the air filter to accumulate significant amount of particulate which will restrict air flow and, therefore, these air filters are replaced infrequently.

On heavy off-road and over the road vehicles, it is common for air filters to accumulate undesirable amount of particulate in a matter of days. Thus, these air filters need frequent attention to maintain the required air flow. However, air filter replacement is usually prohibitive due to cost of the new air filter requiring the operators of such vehicles to periodically clean air filters. One cleaning method is to repeatedly strike the air filter against a rigid structure to dislodge the particulate. However, it has been found that such method does not remove all accumulated particulate. Another method involves use of an air hose with the nozzle inserted into the inner aperture or cavity of the air filter. However, the air is discharged through the nozzle at higher than desirable pressure capable of damaging the filtering medium and requires greater than desirable effort and concentration by the operator to adequately clean the air filter without damaging filtering medium.

Prior to the present invention, efforts have been made to alleviate difficulties in cleaning air filters.

U.S. Pat. No. 5,078,763 issued to Blount-Gillette discloses one type of a portable air filter cleaning device that includes a bottom plate member having a flat upper surface, an apertured vertical column connected to a high pressure air hose and fixed to the bottom member, and a top plate member, removable from the vertical column, having a flat bottom surface, where an annular filter is placed around the vertical column and top plate member is placed onto the vertical column, sealing the filter between the top plate member and the bottom plate member. Air is then forced into the vertical column, exiting through the apertures and through the filter itself, forcing any accumulated particles off the surface of the filter. The disadvantage of this prior art device is in that the vertical column has a fixed length which is not adequate to properly clean all air filters presently in use.

U.S. Pat. No. 3,958,296 issued to Fell discloses another type of the portable filter cleaning device that includes a housing and an upper member. The air filter to be cleaned is inserted between the housing and the upper member. The upper member is provided with a vertically depending rotatable pipe means provided with radially directed nozzles. The pipe means is also provided with a pair of nozzles directed at an angle to the radial to provide a rotary movement to the pipe means. The air filter cleaner may be operated from air compressors readily available on the job site, such as compressors on the heavy construction equipment itself. However, it has been found that rotational speed of the pipe means is dependent on the inner diameter of the air filters with air filters having smaller diameter being cleaned better than air filters having larger diameter. Furthermore, the prior art device of Fell is disadvantaged by the fixed length of the pipe means.

In U.S. Pat. No. 6,588,057, McMahon discloses yet another type of the portable air filter cleaning device that includes en elongated, readily gripable handle having a through bore and a connector at one end for coupling to an air supply hose, and a rotary head is rotatably mounted on the other end of the handle. The rotary head has an internal air distribution chamber with small outlet openings in its outer peripheral wall for spraying air from the chamber. Rotor outlet passageways in the peripheral wall are arranged at an angle to cause the head to spin in a turbine-like fashion when air flow is directed from the chamber and out through the passageways. The rotating head sprays air outwardly across the surface of an air filter unit to dislodge dirt from filter paper in a filter unit. McMahon overcomes the disadvantage of the fixed length member of Blount-Gillette and Fell in that the head is manually movable along the entire length of the air filter, however, greater then desirable effort is required to clean each air filter due to the axial movement of the rotary head. Another disadvantage of this prior art device is in that the operator is burdened by the responsibility to control the pressure applied by the rotating head onto the filtering medium. Yet another disadvantage of this prior art air filter cleaning device is that the ends of the air filter are not sealed during cleaning process thus wasting the supplied air pressure and increasing the time required to clean the filter.

Therefore, there is a need for an improved portable apparatus for equally cleaning air filters of various lengths and diameters and for controlling the amount of air pressure applied to the inner surface of the filtering medium.

SUMMARY OF THE INVENTION

According to one aspect, the invention provides a portable apparatus for cleaning an elongated air filter which is generally employed in internal combustion engines on heavy off-road or over the road vehicles. The apparatus includes a housing having a first end and an opposed second end. Exterior surface of the housing is engageable with one end of such air filter. A generally closed chamber is formed within the housing and has an irregular inner wall surface capable of providing resistance to a fluid flow within the chamber. Provided is an elongated shaft which has a longitudinal bore formed there through. A first end thereof is mounted for rotation adjacent to and spaced from the first end of the housing and external to the chamber. The elongated shaft extends outwardly from the first end of the housing, along a longitudinal axis thereof, through the chamber. An outer surface of the elongated shaft is sized for insertion into a center aperture or cavity of such air filter. Plurality of nozzles are secured, in open communication with the longitudinal bore, to the elongated shaft adjacent to and spaced from the first end thereof. The nozzles are positioned within the chamber for discharging the fluid flow there into. There are orifices which are radially formed through a wall of a portion of the elongated shaft which extends from the chamber and which are arranged in a predetermined pattern. A fluid communication means is secured to the housing in fluid communication with the longitudinal bore of the elongated shaft. The fluid communication means is connectable to a source of fluid under pressure for supplying the fluid under pressure to the longitudinal bore, whereby the supplied fluid exits through the plurality of jets forming the fluid flow that contacts the irregular inner wall surface of the chamber causing rotation of the elongated shaft in a direction which is opposite to a direction of the fluid flow and exits the orifices in a direction toward an inner surface of a filtering medium of such air filter causing contaminants to exit such air filtering medium through an outer surface thereof.

According to another aspect, the invention provides an improvement for a device employed for cleaning an annular air filter. Such device includes an elongated hollow member positioned within the annular air filter and connected at one end thereof to a supply of air pressure and a plurality of orifices formed through a wall of the elongated hollow member for directing the air pressure toward an inner surface of the air filter. The improvement includes the elongated hollow member having a plurality of telescoping portions for adjustment to various lengths.

According to yet another aspect, the invention provides a portable air storage device for use with a portable apparatus for cleaning an elongated air filter which is generally employed in internal combustion engines on heavy off-road or over the road vehicles. The air storage device includes a canister having a predetermined volume. A first valve means is secured to a first portion of a wall of the canister in air communication with an interior portion of the canister for refilling the canister from a source of air pressure. A second valve means is secured to a second portion of the wall of the canister in air communication with the interior portion of the canister for limiting pressure of the air stored there within. Air communication means is provided for enabling discharge of the air pressure stored within the canister.

OBJECTS OF THE INVENTION

It is, therefore, one of the primary objects of the present invention to provide a portable apparatus for cleaning air filters which compressed air.

Another object of the present invention is to provide a portable apparatus for cleaning air filters which are used in internal combustion engines on heavy off-road and over the road vehicles.

Yet another object of the present invention is to provide a portable air filter cleaning apparatus which is suitable for use with air filters of different lengths.

A further object of the present invention is to provide a portable air filter cleaning apparatus which is suitable for use with air filters of various diameters.

Yet a further object of the present invention is to provide portable air filter cleaning apparatus which is capable of sealing open ends of the air filter during cleaning process.

An additional object of the present invention is to provide a portable air filter cleaning apparatus which includes a rotating elongated hollow member having a plurality of apertures to direct supplied air pressure to the inner surface of the filtering medium.

Another object of the present invention is to provide a portable air filter cleaning apparatus which includes an elongated hollow member rotatable at a constant speed when used on air filters of variable diameters.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Prior to proceeding to the more detailed description of the present invention, it should be noted that, for the sake of clarity and understanding, identical components which have identical functions have been identified with identical reference numerals throughout the several views illustrated in the drawing figures.

Reference is now made, to FIGS. 1-7, wherein there is shown a portable apparatus, generally designated as 10, for cleaning an elongated air filter 2 which is generally employed in internal combustion engines on heavy off-road or over the road vehicles which are not shown but well known in the art. Briefly, such air filter 2 has a hollow cylindrical shape characterized by a center cavity 4 when one end of the air filter is closed or by an aperture 4 when both ends are open. A filtering medium 6 is mounted intermediate ends of the air filter 2 and has interior surface 8 and exterior surface 9.

Figure 3:
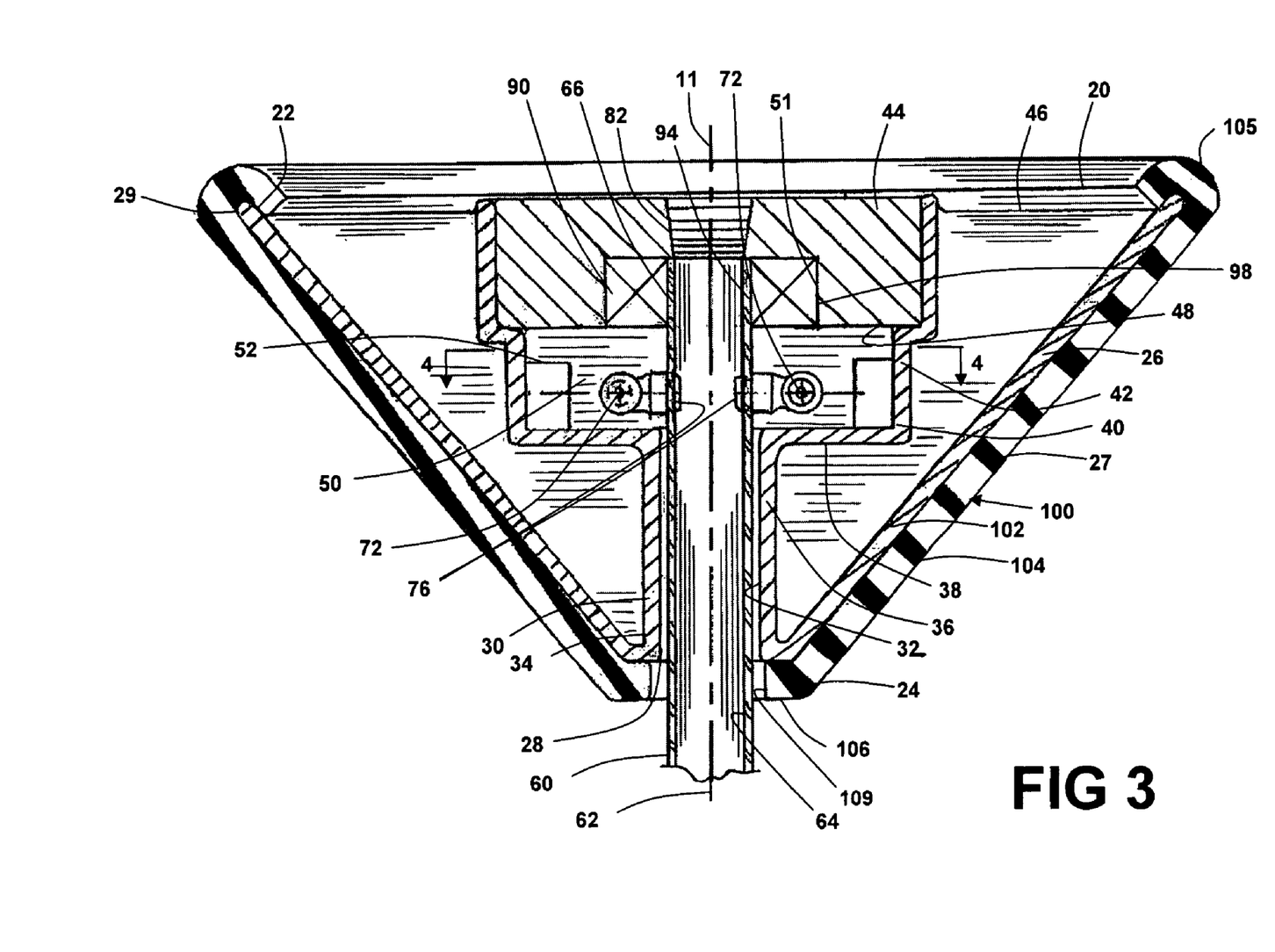
FIG. 3 is a partial cross-sectional view of the portable apparatus of FIG. 1 along lines 3-3 of FIG. 2.

The apparatus 10 includes a housing 20, best illustrated in FIG. 3, having a first generally open end 22 and an opposed second end 24 which is positioned adjacent one end of such air filter 2. The presently preferred shape of each end is round. The presently preferred diameter of the first end 22 is about 8.0 inches and the presently preferred diameter of the second end 24 is about 1.0 inch. It is further presently preferred for the housing 20 to have a frustoconical wall 26 defining a generally open frustoconical shape of the housing 20. The wall 26 has a predetermined thickness which minimizes the weight of the housing 20 while providing structural rigidity of the housing 20 during use.

The second end 24 has a centrally disposed aperture 28 formed there through. An annular boss 30 has a first end 34 thereof disposed on and secured to the inner surface of the second end 24. The annular boss 30 extends along the longitudinal axis 11 of the apparatus 10 toward the first end 22 of the housing 20. A radially disposed annular shoulder 38 is secured to and terminates the second end 36 of the annular boss 30. The annular shoulder 38 is adapted with a peripheral flange 40 which is secured thereto and which extends toward the first end 22 of the housing 20. A disk like member 44 is disposed on and secured to a terminal edge 42 of the peripheral flange 40. Plurality of optional reinforcement ribs 46 may be employed joining an inner surface of the wall 26 with outer surfaces of each of the annular boss 30, shoulder 38, peripheral flange 40 and disk 44.

Figure 4:
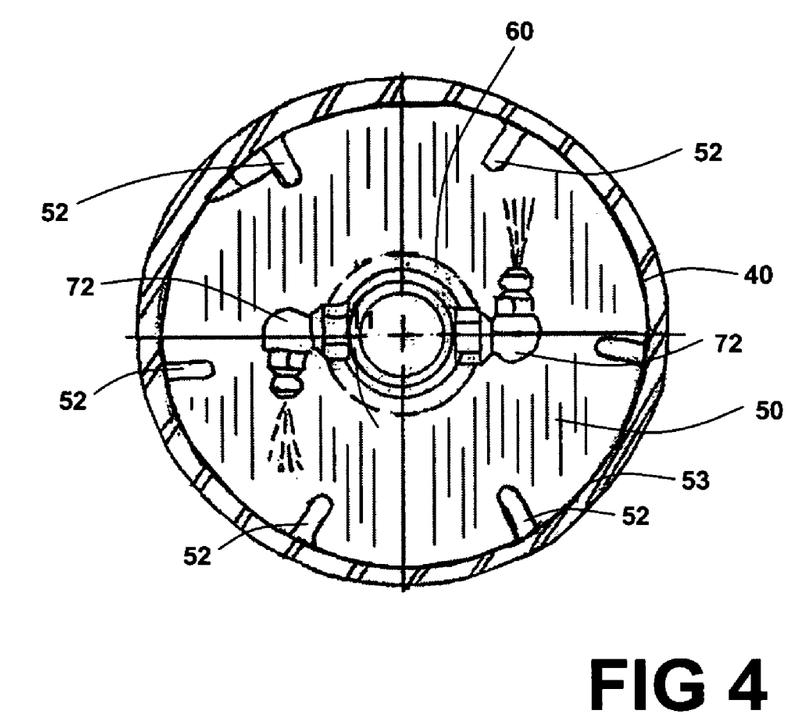
FIG. 4 is a cross-sectional view of the portable apparatus of FIG. 1 along lines 4-4 of FIG. 3, particularly illustrating baffles formed within the air chamber.

For the reasons to be explained later, the bottom surface 48 of the disk 44 and inner surfaces of each of the annular shoulder 38 and the peripheral flange 40 form a generally closed chamber 50. It is important to note that the chamber 50 is disposed stationary relative to the housing 20. Plurality of fins or baffles 52 are secured within the chamber 50 along the inner surface of the annular shoulder 48 and the inner surface of the peripheral annular flange 40 each disposed at a predetermined angle relative to a line tangential to such annular flange 40, as best shown in FIG. 4. Such fins or baffles 52 form an irregular inner wall surface 53 of the chamber 50 which is capable of providing resistance to fluid flow within the chamber 50. Alternatively, such irregular inner wall surface 53 may be formed by a plurality of cavities (not shown) formed therein or by a plurality of teeth-like projections (not shown).

Preferably, the housing 20, including the chamber 50, is formed as a single piece member from a rigid plastic material by a molding process. Alternatively, the housing 20 may be manufactured from a metallic material, for example, such as aluminum.

An elongated shaft 60 is provided and has a longitudinal bore 64 formed therein along a longitudinal axis 62 thereof which is coaxial with the longitudinal axis 11 of the apparatus 10. A first end 66 of the shaft 60 is mounted for rotation about the housing 20 and chamber 50. Accordingly, a cavity 51 is axially formed in the bottom surface 48 of the disk 44 and is sized to operably receive the exterior surface of the first end 66 of the shaft 60. The shaft 60 extends outwardly from the bottom surface 48 of the disk 44, along the longitudinal axis 62 through the chamber 50 and through the inner bore 32 of the annular boss 30. It will be appreciated that the inner bore 32 is sized to allow rotation of the shaft 60. The outer diameter of the elongated shaft 60 is sized for insertion into the center aperture or cavity 4 of such air filter 2.

Pair of nozzles are secured, in open communication with the longitudinal bore 64, to the elongated shaft 60 adjacent to and spaced from the first end 66 so that the nozzles are positioned within the chamber 50 and are free to rotate there within upon rotation of the elongated shaft 60. Each nozzle is formed by a conventional L-shape Zerk fitting 72 which has a threaded end thereof received within a threaded aperture 76 being radially formed through the wall 65 of the elongated shaft 60. The outlet end of the fitting 72 is directed generally tangential to the exterior surface of the elongated shaft 60, although other orientations of the fitting 72 are within the scope of the present invention.

Figure 5:
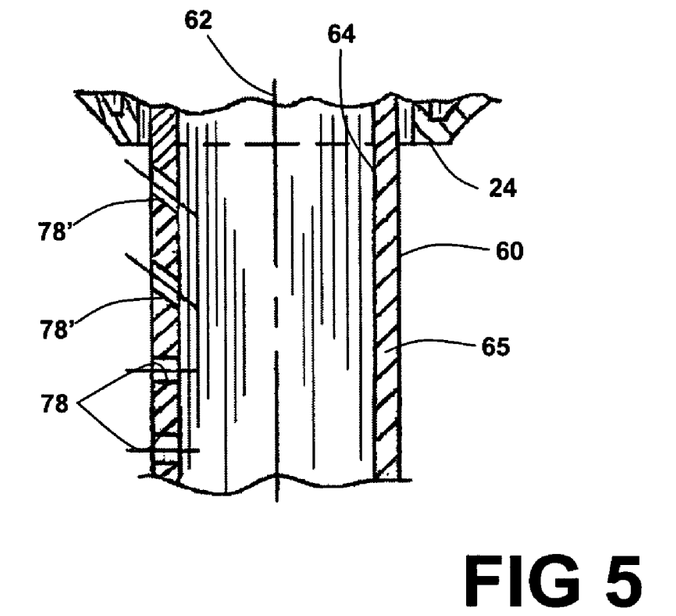
FIG. 5 is a partial cross-sectional view of the portable apparatus along lines 5-5 of FIG. 1, particularly illustrating upwardly angled orifices formed through the wall of the elongated shaft.

Plurality of orifices 78 are radially formed, in a predetermined pattern, through the wall of a portion of the elongated shaft 60 which extends outwardly from the chamber 50. Now, in a particular reference to FIG. 5, at least one orifice 78 which is disposed adjacent the second end 24 of the housing 20 and which is referenced, for the sake of clarity, by reference numeral 78' is inclined upwardly at a predetermined angle, as best shown in FIG. 5, for facilitating cleaning the end of the air filter 2 which is engageable with the housing 20 being partially inserted into such end of the air filter 2. The diameter of each orifice 78 is predetermined based on the pressure of the supplied fluid so that such fluid exits orifices 78 at a pressure of about 45 pounds per square inch (PSI) which has been found sufficient to adequately clean the filtering medium 6 without inflicting structural damages thereto.

A fluid communication means is secured to the housing 20 in fluid communication with the longitudinal bore 64 of the elongated shaft 60 for supplying the fluid pressure to the longitudinal bore 64. The fluid communication means may be a simple threaded aperture 82 formed in the disk 44 and, preferably, the present invention provides for a male quick release fitting 84 which is threadably connected to such threaded aperture 82. It will be appreciated that the male quick release fitting 84 is coupled to a female quick release fitting 85 which is typically secured to one end of the hose 86, depicted in FIG. 6.

In operation, the elongated shaft 60 is first inserted into the center aperture or cavity 4 of the air filter 2. The exterior surface 27 of the conical wall 26 of the housing 20 is positioned in abutting relationship with the one end of the air filter 2. The frustoconical shape of the wall 26 enables the user of the apparatus 10 to simply and easily center the elongated shaft 60 within the aperture or cavity 4. Fluid, which is preferably air, under pressure enters the longitudinal bore 64 through fluid communication means arid exits the longitudinal bore 64 through the plurality of nozzles 72. Upon exiting the nozzles 72, the air flow contacts fins or baffles 52 of the chamber 50, which are angled relative to the direction of air flow, causing resistance to air flow and, more particularly, causing the elongated shaft 60 to rotate in a direction opposite to the air flow from the nozzles 72. Generally at the same time, supplied air under pressure exits the longitudinal bore 64 through the plurality of orifices 78 toward the inner surface 8 of the filtering medium 6 of such air filter 2 causing particulate captured within such filtering medium 6 to exit through the outer surface 9 thereof.

It has been found that a single row of the orifices 78 which are spaced there between relative to the longitudinal axis 62 of the elongated shaft 60 is sufficient to clean air filter 2 due to the rotation of the elongated shaft 60. However, it is within the scope of the present invention to provide additional rows of the orifices 78.

The criticality of the chamber 50 is in that it provides for a constant rotational speed of the elongated shaft 60 regardless of the diameter of the inner aperture or cavity 4 of the air filter 2. Thus, air filters 2 of various inner diameters are equally cleaned. It has also been found that such chamber 50 causes vibration of the apparatus 10 and subsequent vibration of the air filter 2 facilitating evacuation of the pollutant impurities from the filtering medium 6.

It is not required, for proper operation of the apparatus 10, for the chamber 50 to be completely sealed and therefore, some air leakage is allowed between the exterior surface of the elongated shaft 60 and surface of the inner bore 32 of the annular boss 30. However, the present invention contemplates that a seal (not shown) may be mounted within the second end 24 of the housing 20 or at one end of the annular boss 30 to seal the chamber 50.

Preferably, to accommodate air filters of different length, the elongated shaft 60 is telescoping, so that adjustment can be made during use of the apparatus 10 depending on the length of the air filter 2. It is further presently preferred to close the second end 68 of the elongated shaft 60. Thus, during use, the air pressure that enters the longitudinal bore 64 will force the telescopic portion, having such second end 68 disposed therein, outwardly until the second end 68 reaches the end of the air filter 2.

The telescoping of the elongated shaft 60 includes a securing means, generally designated as 69, for setting a desired length of the elongated shaft 60. It is presently preferred that the securing means 69 for setting the desired length for the telescoping elongated shaft 60 is a friction fit including a spring (not shown) which may be aided with an optional turning movement as is well known in the art for securing telescopic tubular members in the extended or collapsed positions.

Figure 1:
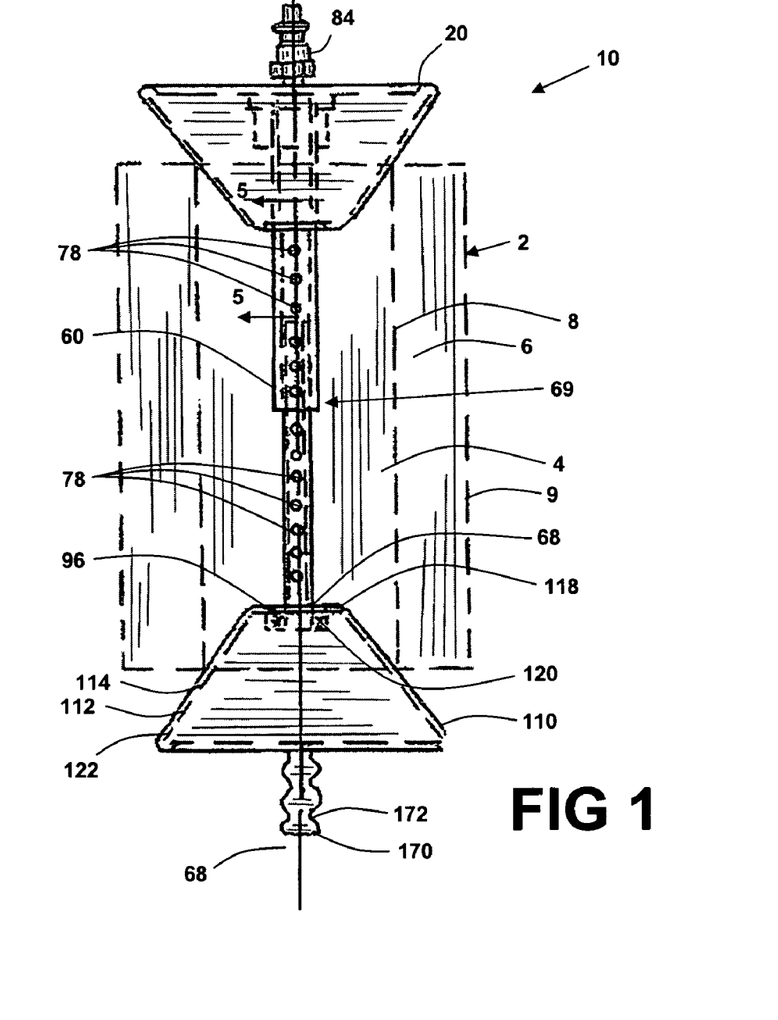
FIG. 1 is an elevation view of a portable apparatus for cleaning air filters of the present invention.
Figure 2:
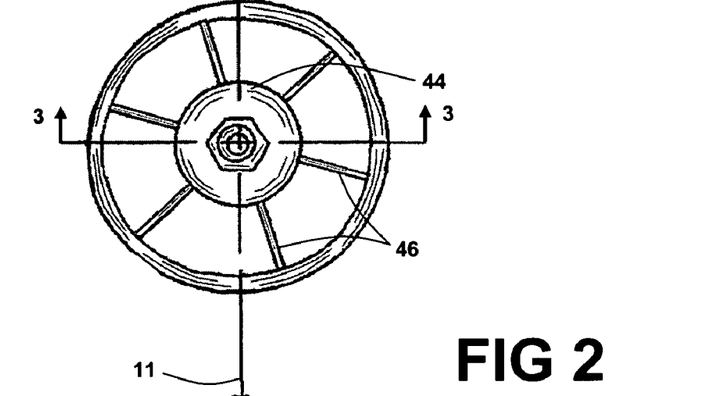
FIG. 2 is a top view of the portable apparatus of FIG. 1.

Although, the elongated shaft 60 is shown in FIG. 1 as having two telescoping portions, the present invention contemplates that any number of telescoping portions may be employed within the elongated shaft 60.

To facilitate rotation of the elongated shaft 60, the present invention provides for a sealed radial bearing 90 which has an outer race 92 thereof operably secured within the cavity 51 which is then sized accordingly and wherein the first end 64 of the elongated shaft 60 is secured to an inner race 94 of the bearing 90. Alternatively to the radial bearing 90, a simple self-lubricating bushing (not shown) manufactured either from a metal or hard polymer may be employed in the present invention.

While the housing 20 may be sufficient to close the end of the air filter 2, it is presently preferred to provide a seal 100 which has an inner surface 102 thereof engageable with the exterior surface 27 of the wall 24 of the housing 20 and which has an exterior surface 104 thereof engageable with and sealing such one end of such air filter 2. The seal 100 is preferably manufactured from a soft elastomeric material, such as rubber, capable of compressing upon contact with the end of the air filter 2. The bottom end of the seal 100 has a flange 106 which is sized to partially overlap the second end 24 of the housing 20 and which has an aperture 109 formed therein to allow passage of the elongated shaft 60. A U-shaped portion 108 terminates the top end of the seal 100 and is sized to hook onto the open edge 29 of the wall 26. Thus, during installation the wall portion of the seal 100 is stretched slightly to enable hooking of the U-shaped portion 108 terminates onto the edge 29 of the wall 26 and, more particularly, enabling secure but yet detachable attachment of the seal 100 onto the housing 20. The U-shaped portion 108 is also advantageous in protecting the edge 29 if the housing 20 is inadvertently dropped or banged against a rigid structure.

When the air filter 2 has both open ends, it is within the scope of the present invention to provide a seal means 110 for sealing the second end of the air filter 2. By way of an example only of FIG. 1, such seal means 110 may include a frusto-conical member 112 having a wall 114 and an exterior surface 116. A small end 118 of the member 112 is provided with a cavity 120 sized to rotatably receive the second end 68 of the elongated shaft 60. A second seal 122, which is preferably constructed identical to the seal 100, is attached to the frusto-conical member 112.

To further facilitate rotation of the elongated shaft 60, a second bearing 96 is operably secured within the cavity 120 of the member 112 and is securely attached to the second end 68 of the elongated shaft 60. However, it is within the scope of the present invention to employ the bearing 96 being securely attached to the second end 68 of the elongated shaft 60 when the air filter 2 has one closed end and when the second seal means 110 is not being used.

Figure 6:
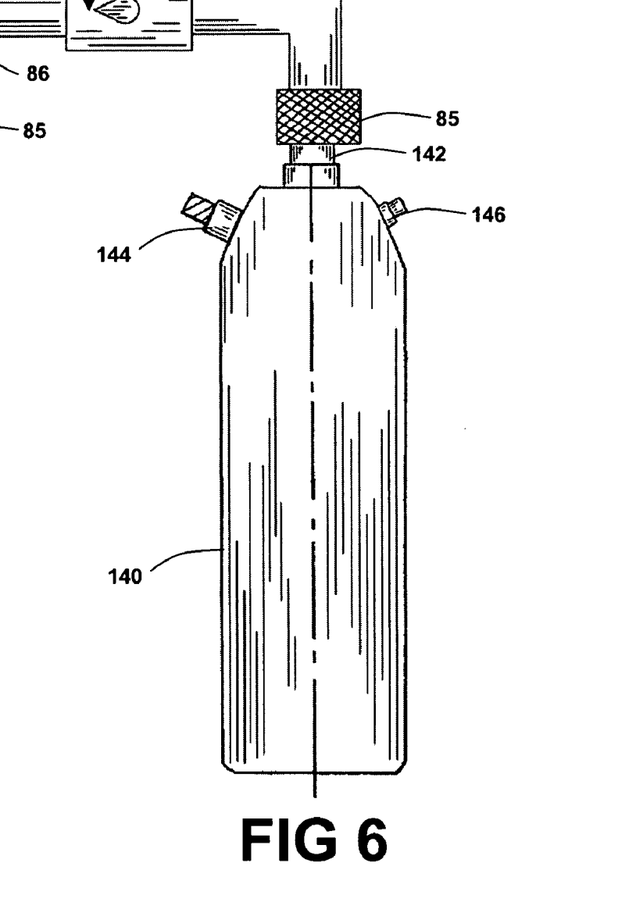
FIG. 6 is an elevation view of an air pressure storage container for use with the portable apparatus for cleaning air filters of FIG. 1.

Now in a particular reference to FIG. 6, the present invention provides an optional portable source of fluid pressure, such as a simple canister 140, which preferably has a male quick release fitting 142 operably secured to its outlet end. Accordingly, the second end of the hose 86 is adapted with a second female quick release fitting 85 for coupling to the male quick release fitting 142.

Furthermore, it is presently preferred to adapt the canister 140 with a well known tire stem valve 144 for simply and conveniently refilling or recharging an empty canister 140. Furthermore, a safety valve 146 is then provided for limiting the air pressure stored in the portable canister 140 during refilling effort to about 200 PSI. A manually operated shut-off valve 150 is positioned in the air supply stream intermediate the ends of the hose 86 for selectively supplying air pressure from the canister 140 to the apparatus 10. The size of the canister 140 is preselected to enable consecutive cleaning of the air filter 2 between recharging while enabling convenient storage of the canister 140 in tight quarters. It has been determined that the canister having diameter of about 2.5 inches and length of about 10 inches is sufficient to clean most air filters 2 three to four times prior to being in need of recharge. Thus the user of the apparatus 10 can simply and easily store the apparatus 10 and the canister 140 within the vehicle and use it at a predetermined intervals, for example when filling such vehicle with gasoline.

Although the present invention has been shown in terms of the housing 20 constructed as a single piece member with the disk 44 rigidly secured thereto, it will be apparent to those skilled in the art, that the disk 44 may be adapted for detachable attachment within the housing 20 in a snap-fit manner. Such detachable attachment may be advantageous for minimizing space envelope during shipping and storage as well as for maintaining the nozzles 72 and bearing 90.

It may be further advantageous to provide at least one handle member 160 for facilitating handling of the apparatus 10 during use. Now in particular reference to FIG. 7, such handle member 160 is illustrated as being secured to the disk 44 and is preferably formed integral therewith. The depicted handle member 160 has an elongated shape and is provided with a conventional grip portion 162. An aperture 166 is axially formed there through for mating with the bore 64 of the elongated shaft 60. A free end of the handle member 160 is updated for receiving the male fitting 84.

Figure 7:
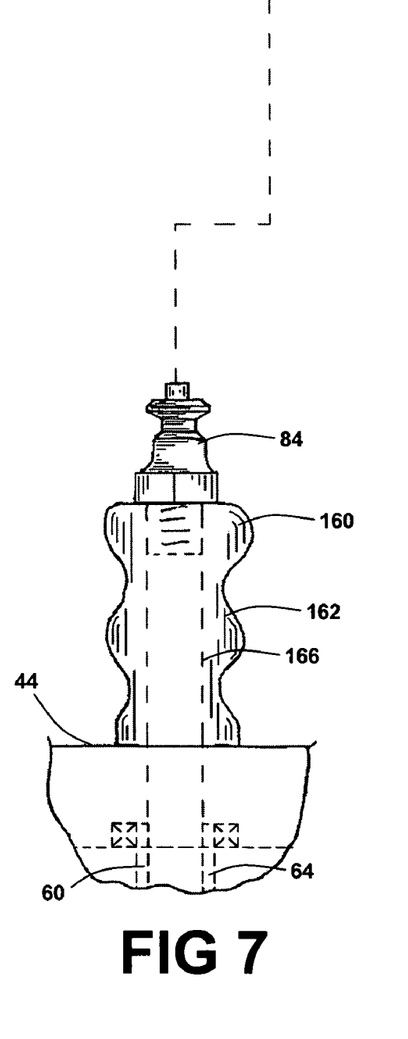
FIG. 7 is a partial elevation view of the portable apparatus of FIG. 1, particularly illustrating optional handle member.

A second handle member 170 may be secured to the member 112 and provided with the grip portion 172.

Additionally, it is within the scope of the present invention to replace the male quick release fitting 84 with a tire stem valve 144 enabling simple connection of the apparatus 10 to the tire filling system found at most gas and service stations.

It will be further apparent to those skilled in the relevant art, that other shapes, for example such spherical dome, of the seals 110, 122 and respective shapes of the housing 20 and the member 112 may be applied in the present invention for sealing a respective end of the air filter 2.

Figure 8:
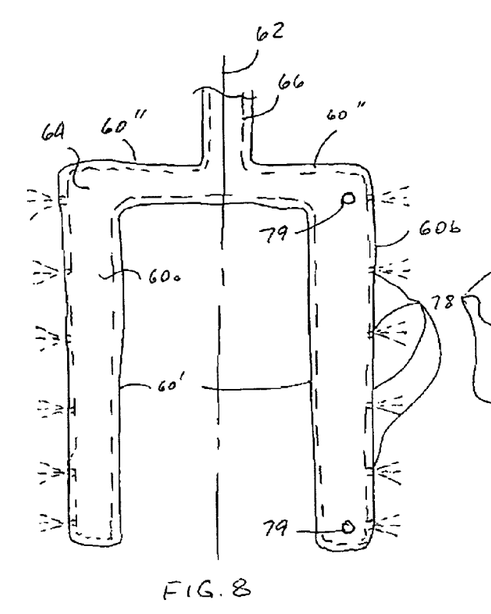
FIG. 8 is a partial elevation view of the portable apparatus of FIG. 1, particularly illustrating one form of the elongated shaft.
Figure 9:
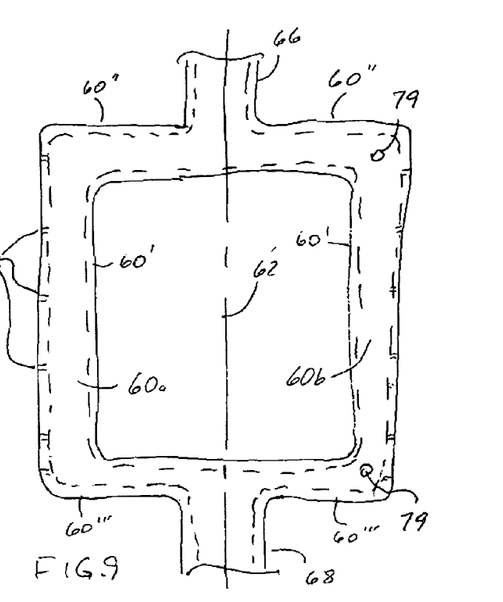
FIG. 9 is a partial elevation view of the portable apparatus of FIG. 1, particularly illustrating another form of the elongated shaft.
Figure 10:
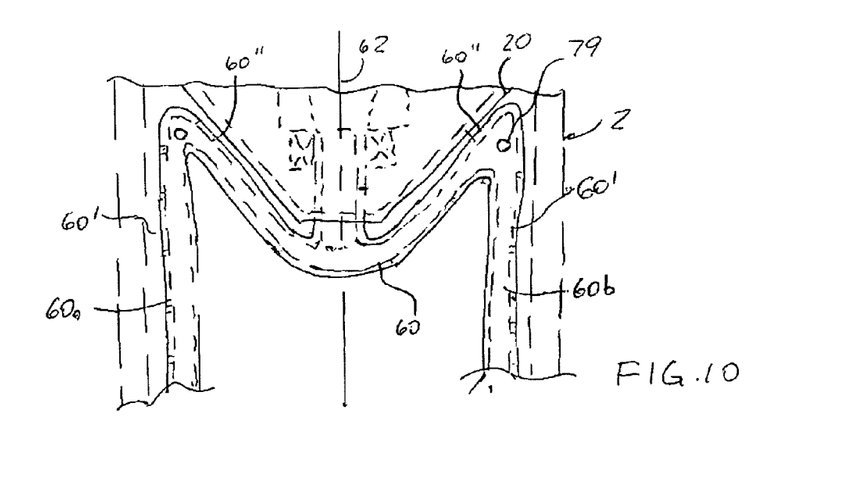
FIG. 10 is a partial elevation view of the portable apparatus of FIG. 1, particularly illustrating yet another form of the elongated shaft.

It is also within the scope of the present invention that in order to accommodate air filters of larger diameters, as well as applications requiring outmost degree of cleanness, the portion of the elongated shaft 60 extending outwardly from the chamber 50 and disposed between ends 66, 68 may be provided in various shapes. By way of an example of FIG. 8, such portion may be provided as a pair of generally L-shaped branches 60a, 60b each having a first leg 60' thereof disposed substantially parallel to one another and substantially parallel to the longitudinal axis 62. The first leg 60' is positioned in close proximity to the interior surface 8 of the air filter 2. The second leg 60" of each branch 60a, 60b is connected to the first end 66 of the elongated shaft 60 thus forming a generally U-shape thereof. The internal bore 64 is then formed through both legs 60', 60" and an end of the second leg 60" is open for fluid communication with such first end 66. Consequently, the orifices 78 are formed in at least each first leg 60' of each branch 60a, 60b and may be also formed in the second leg 60". When the seal means 110 is employed and receives the second end 68 of the elongated shaft 60, an opposed end of each branch 60a, 60b is also open and bent inwardly, by way of a third leg 60''', for connection to the second end 68 of the elongated shaft 60, as best shown in FIG. 9. It is also contemplated to dispose at least one leg of each branch 60a, 60b at an angle with respect to the longitudinal axis 62 of the elongated shaft 60 so that it can be positioned in close proximity to the surface of the member 20, 112, as best shown in FIG. 10. In either configuration of FIGS. 8-10, additional air vents 79 may be formed through the wall of at least one branch 60a, 60b and oriented substantially perpendicular to the orifices 78 for aiding the nozzles in rotation of the elongated shaft 60.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. A portable apparatus for cleaning an elongated air filter which is generally employed in internal combustion engines on heavy off-road or over the road vehicles, said apparatus comprising:
   (a) a body having each of a first end, an opposed second end and an exterior peripheral surface sized and shaped to pass into a center aperture or cavity of the air filter during use of said apparatus;
   (b) a generally closed chamber which is formed within said body and which has an irregular inner wall surface capable of providing resistance to a fluid flow within said chamber;
   (c) an elongated shaft having a longitudinal bore formed there through and a first end thereof mounted for rotation adjacent to and spaced from said first end of said body and external to said chamber, said elongated shaft extending outwardly from said first end of said body, along a longitudinal axis thereof, through said chamber, wherein an outer surface of said elongated shaft is sized for insertion into the center aperture or cavity of the air filter;
   (d) plurality of nozzles secured, in operative communication with said longitudinal bore, to said elongated shaft adjacent to and spaced from said first end thereof, said plurality of nozzles are positioned within said chamber for discharging said fluid flow there into;
   (e) plurality of orifices radially formed through a wall of a portion of said elongated shaft which extends from said chamber, said plurality of orifices arranged in a predetermined pattern; and
   (f) a fluid communication assembly secured to said body in fluid communication with said longitudinal bore of said elongated shaft, said fluid communication assembly is connectable to a source of fluid under pressure for supplying said fluid under pressure to said longitudinal bore, whereby said supplied fluid exits through said plurality of jets forming said fluid flow that contacts said irregular inner wall surface of said chamber causing rotation of said elongated shaft in a direction which is opposite to a direction of said fluid flow and exits said plurality of orifices in a direction toward an inner surface of a filtering medium of the air filter causing contaminants to exit the air filtering medium through an outer surface thereof.

2. The apparatus, according to claim 1, wherein said apparatus includes a bearing which has an outer race thereof operably secured within a cavity formed in said body and wherein said first end of said elongated shaft is secured to an inner race of said bearing for facilitating rotation of said elongated shaft caused by said fluid pressure supply.

3. The apparatus, according to claim 1, wherein said apparatus further includes a bearing which has an inner race thereof operably secured to an opposed second end of said elongated shaft and which has an outer race thereof sized to be received within the center cavity of the air filter for facilitating rotation of said elongated shaft caused by said fluid pressure supply.

4. The apparatus, according to claim 1, wherein said apparatus further includes a seal having an inner surface thereof sized to fit said exterior surface of said body and an opposed outer surface thereof engaging and sealing the one end of the air filter.

5. The apparatus, according to claim 1, wherein said apparatus further includes a seal means for sealing an opposed open end of the air filter.

6. The apparatus, according to claim 5, wherein said seal means includes a cavity formed therein and sized to rotatably receive a second end of said elongated shaft and wherein said apparatus further includes a bearing secured to said second end of said elongated hollow shaft and operatively secured within said cavity formed in said seal means for facilitating rotation of said elongated shaft caused by said supply of fluid under pressure.

7. The apparatus, according to claim 1, wherein said apparatus includes said source of said fluid under pressure and means for connecting said source to said fluid communication assembly.

8. The apparatus, according to claim 7, wherein said source of said fluid under pressure is a canister.

9. The apparatus, according to claim 8, wherein said fluid pressure connection assembly includes a hose which has one end thereof being connected to an output port of said source of said fluid under pressure and a coupling means for releaseably coupling a distal end of said hose to said fluid communication means.

10. The apparatus, according to claim 8, wherein said apparatus further includes means for refilling said source of said fluid under pressure.

11. The apparatus, according to claim 8, wherein said apparatus further includes fluid pressure release means which is operably connected to said source of said fluid under pressure for limiting pressure of said fluid stored there within to a predetermined value.

12. The apparatus, according to claim 1, wherein said elongated shaft includes plurality of telescoping portions for adjustment to various lengths.

13. The apparatus, according to claim 12, wherein said elongated shaft further includes a securing means for setting a desired length thereof.

14. The apparatus, according to claim 13, wherein said securing means is a friction fit.

15. The apparatus, according to claim 1, wherein said irregular inner wall surface of said chamber includes a plurality of baffles each secured to said inner wall surface of said chamber at a first edge thereof and extending toward said elongated member at a predetermined angle relative to said fluid flow discharged from said nozzles.

16. The apparatus, according to claim 1, wherein each nozzle is directed generally tangential to an exterior surface of said elongated shaft.

17. In a device for cleaning an annular air filter, said device including an elongated hollow member positioned within said annular air filter and connected at one end thereof to a supply of air pressure and a plurality of orifices formed through a wall of said elongated hollow member for directing said air pressure toward an inner surface of said air filter, an improvement comprising said elongated hollow member having a plurality of hollow telescoping portions for adjustment to various lengths, each of said plurality of hollow telescoping portions having a portion of said plurality of orifices spaced apart along a length thereof.

18. The apparatus, according to claim 1, wherein said portion of said elongated shaft extending from said chamber is formed by a pair of branches, each of said pair of braches having each of a first leg thereof disposed substantially parallel to one another and substantially parallel to said longitudinal axis and a second leg thereof connected to one end of said first leg and to said first end of said elongated shaft, wherein said internal bore is formed through said first and second legs in fluid communication with said first end and wherein said plurality of orifices are formed through a wall of at least said each first leg of said pair of branches.

* * * * *